(12) United States Patent
Sloss

(10) Patent No.: US 10,088,566 B2
(45) Date of Patent: Oct. 2, 2018

(54) OBJECT TRACKING USING SONAR IMAGING

(71) Applicant: Martyn Sloss, Fife (GB)

(72) Inventor: Martyn Sloss, Fife (GB)

(73) Assignee: Coda Octopus Group Inc., Orlando, FL (US)

( * ) Notice: Subject to any disclaimer, the term of this patent is extended or adjusted under 35 U.S.C. 154(b) by 392 days.

(21) Appl. No.: 14/927,748

(22) Filed: Oct. 30, 2015

(65) Prior Publication Data

US 2017/0123061 A1    May 4, 2017

(51) Int. Cl.
*A61B 8/00*     (2006.01)
*G01S 15/89*    (2006.01)

(52) U.S. Cl.
CPC .................................. *G01S 15/89* (2013.01)

(58) Field of Classification Search
USPC ........................................................ 367/11
See application file for complete search history.

(56) References Cited

PUBLICATIONS

Riordan, James, Edin Omerdic, and Daniel Toal. "Implementation and application of a real-time sidescan sonar simulator." Oceans 2005—Europe. vol. 2. IEEE, 2005.*
Bülow, Heiko, et al. "Underwater stereo data acquisition and 3D registration with a spectral method." OCEANS—Bergen, 2013 MTS/IEEE. IEEE, 2013.*
Campos, Ricard, et al. "A surface reconstruction method for in-detail underwater 3D optical mapping." The International Journal of Robotics Research 34.1 (2015): 64-89.*

* cited by examiner

*Primary Examiner* — Isam A Alsomiri
*Assistant Examiner* — Jonathan D Armstrong
(74) *Attorney, Agent, or Firm* — Rodney T. Hodgson (57) ABSTRACT

An object is measured to record the relative surface coordinates. Then, a portion of the object "the front side" immersed in a fluid is imaged by directing a sonar pulse at the object and recording sonar signals reflected from the object with a sonar imaging array. Then, the recorded relative surface coordinates are iteratively fit to coordinates calculated from the sonar image. Thereafter, the coordinates of the surface of the "backside" of the object that is not observable in the sonar image are known, and a computer generated image of the backside is stitched to sonar image so that the object can be viewed from a plurality of viewpoints separated from the sonar imaging array.

6 Claims, 7 Drawing Sheets

OBJECT TRACKING USING SONAR IMAGING

RELATED PATENTS AND APPLICATIONS

The following U.S. Patents and U.S. patent applications are related to the present application: U.S. Pat. No. 6,438,071 issued to Hansen, et al. on August 20, 2002; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015. U.S. patent application filed on the same date as the present application, entitled "Method of stabilizing sonar images" by Sloss are also related to the present application.

The above identified patents and patent applications are assigned to the assignee of the present invention and are incorporated herein by reference in their entirety including incorporated material.

FIELD OF THE INVENTION

The field of the invention is the field of sonar imaging and control.

OBJECTS OF THE INVENTION

It is an object of the invention to produce a sonar image of an object immersed in a fluid, wherein a portion of the surface of the object which is either not irradiated by the sonar source or not in the field of view of a sonar imaging array is imaged on an image receiving device It is an object of the invention to produce a sonar image of an object immersed in a fluid together with a sonar image of background objects which are in the sonar shadow of the object.

It is an object of the invention to translate and rotate an object to fit a portion of the object which is not directly observable with a sonar imaging device into an object receiving aperture formed by at least one background object.

SUMMARY OF THE INVENTION

An object is measured to record the relative surface coordinates. Then, a portion of the object "the front side" immersed in a fluid is imaged by directing a sonar pulse at the object and recording sonar signals reflected from the object with a sonar imaging array. Then, the recorded relative surface coordinates are iteratively fit to coordinates calculated from the sonar image. Thereafter, the coordinates of the surface of the "backside" of the object that is not observable in the sonar image are known, and a computer generated image of the backside is stitched to sonar image so that the object can be viewed from a plurality of viewpoints separated from the sonar imaging array. In particular, the object can be made to rotate on a viewing screen to give a much enhanced three dimensional view. A three dimensional sonar image of background objects is recorded, either before the object is moved into place, or as the object is moving in space relative to the background objects. Then, when the object moved into place in front of the background objects, the background objects shadowed by the object can be represented by stitching a calculated image on to the sonar image of the object and background. Again, as the viewpoint is changed, the background of the object is reconstructed and presented to the viewer. The object can then be rotated and translated to fit into the background objects under computer control or under control of an operator or a robotic machine visualizing the relative position of the object and background objects.

DETAILED DESCRIPTION OF THE INVENTION

Optical inspection of objects in a fluid is often not possible because of smoke and fog in air, for example, or turbidity in water or other fluid. Sonar imaging of such objects is often used. However, if objects are to be placed, grasped, or moved in the fluid, a typical sonar image taken from a single point of view is not sufficient. The "backside" of the object is not viewable, nor is the background of the object in the "sonar shadow" viewable.

Figure 1:
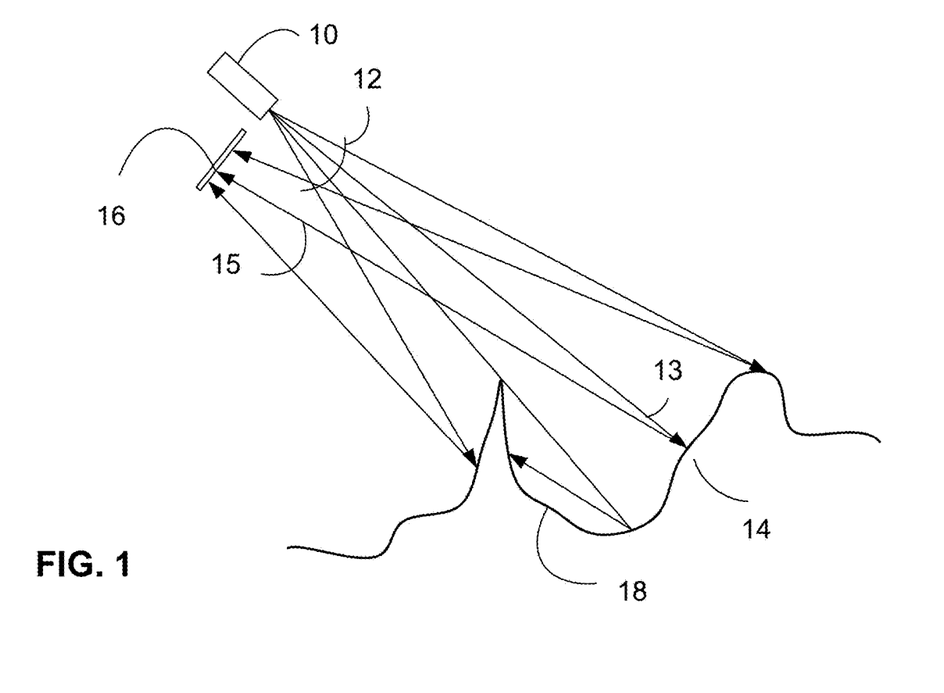
FIG. 1 shows a sketch of a sonar source sending sonar wave to a surface and a sonar array receiving device receiving reflected sonar signals from the surface.
Figure 2A:
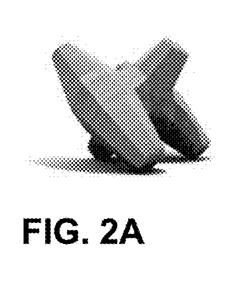
FIGS. 2A-2D show images of different cast blocks used for breakwaters.
Figure 2B:
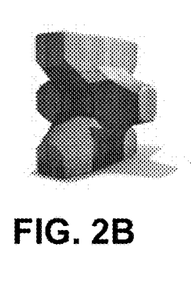
Figure 2C:
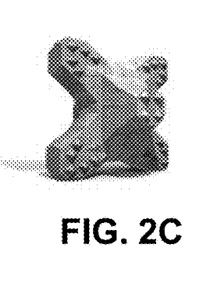
Figure 2D:
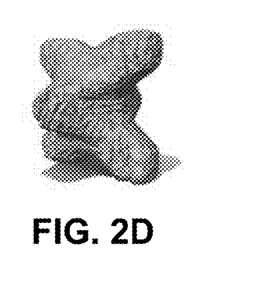

FIG. 1 shows a typical sonar imaging set up, where a source 10 projects an outgoing sound wave noted as a wave front 12. The sound wave can be traced as a ray 13 which strikes a sonar reflecting surface 14 and is reflected as ray 15 to a sonar imaging array 16. If an object, or part of the background, stops the sound waves from striking a region 18, the no data is collected from the region and so it is not imaged and is said to be in a "sonar shadow". A sonar imaging array, such as an Echoscope® from CodaOctopus Inc., comprises an array of microphones which send signals representing the sound waves to electronics and a computer system for analysis. The sonar signal 10 will be a "ping" of duration milliseconds to microseconds. a typical sonar ping will be, say, 70 microseconds in duration and have a frequency of 300-1000 MHz. Each microphone of the array receives a reflected sonar signal of the frequency of the sound wave sent out from the source, but with differing phases. The signal from an object nearer to the imaging array will arrive sooner that a signal from objects in the background, and a filter, for example a time window, can be used to sort out the signals from the different parts of the object and background. The signal is digitally sampled at a rate higher than the frequency of the sound wave, and the amplitude and phase of the signals are recorded. The device works very much like an interferometric imaging device where the intensity and phase of the light are measured. From the measured signals, the range of the various parts of the object from the imaging array can be calculated and the image may be displayed, for example on an optical imaging device or stored in a computer accessible data storage device for further manipulation. A typical imaging device would be a computer monitor, where the image is shown with the "height" of the different parts of the image shown as differing colors. We define this type of image herein as a three dimensional (3D) image. Another type of image would be an image where the surfaces are shaded to give the impression of light and shade which also can be interpreted by a human observer as a 3D image. Another type of 3D image is an image which appears to shift as the viewpoint is shifted, which serves very well to show up the range differences by parallax. Another type of 3D image is the familiar topographic map image, where the regions of equal height are connected with lines. All images where a third dimension can be read on a two dimensional image display are anticipated by the inventor.

When building a breakwater, the top (armor) layer is usually made with large heavy concrete blocks. These blocks must be placed sufficiently densely so as to minimize gaps between them to stop the egress of the underlying layers, and must be sufficiently heavy so as not to be moved by the action of waves and tides. Traditionally two layers of boulders, or in most cases cubic concrete blocks have been used. In order to reduce the amount of material required a new approach was introduced, where complex geometric volumes with overlapping parts were chosen. This allows only one layer of armor to be used while still meeting the minimum gap requirement. Photographs of typical blocks are shown in FIGS. 2A-2D. These blocks are generally made from concrete cast in steel molds, and may be several meters high and weigh many tons. The advantage of the Echoscope® data is that as it is three dimensional (3D), the virtual eye-point can be moved when displaying the data to give the user a better overview of the scene.

Figure 3:
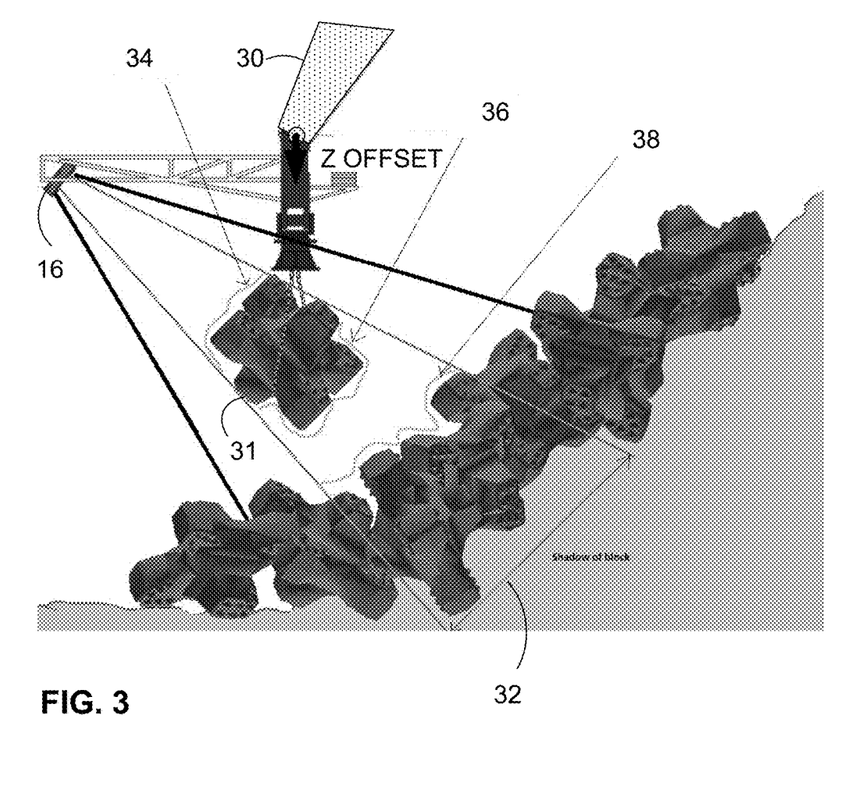
FIG. 3 shows a sketch of an excavator arm carrying a suspended block for placement in a breakwater.
Figure 4A:
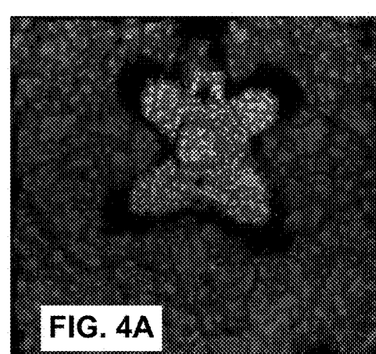
FIG. 4A shows a sonar image of a block casting a shadow against a background.
Figure 4B:
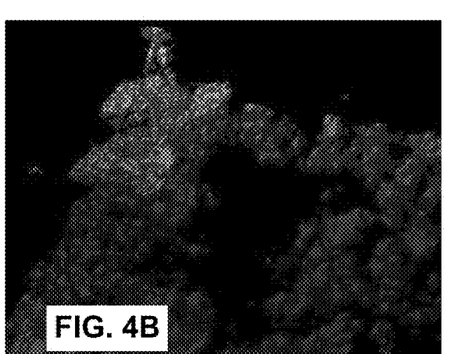
FIG. 4B shows a sonar image of the data of FIG. 4A shown from a different viewpoint.

FIG. 3 shows a sketch of an excavator arm 30 carrying a suspended block 31 for placement in a breakwater. The angular portion 32 of the ensonified region of the background behind the block 31 is called a "sonar shadow", and the portion of the background 38 does not receive sound waves and is "invisible" to the detector 16. One advantage of the 3D visualization made possible by the 3D sonar detector is that the view point of the images drawn may be moved to take advantage of the human recognition of parallax to give the $3^{rd}$ dimensional image information. As the Echoscope® itself is fixed with respect to the scene, this virtual movement makes the shadowing effect more apparent. When the image shown from a viewpoint apart from the sonar array 16 as in FIG. 4B, the points corresponding to the backside of the block are missing and the block appears truncated.

Figure 4C:
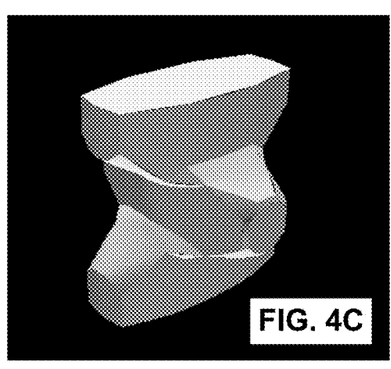
FIG. 4C shows a non-sonar image of a model block.
Figure 4D:
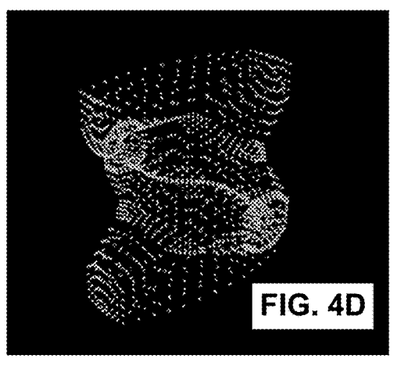
FIG. 4D shows a set of points on the surface of the model of FIG. 4C.
Figure 4E:
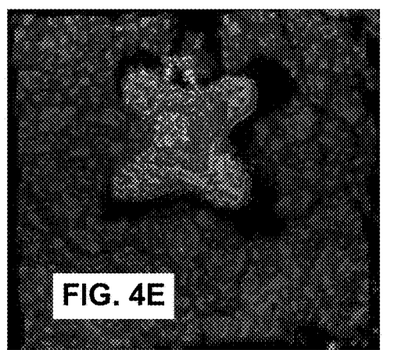
FIG. 4E shows the image of FIG. 4A combined with an image of a model of the block wherein the set of points of FIG. 4D have been fit to points measured from the data of FIG. 4A to give the orientation of the model of FIG. 4C.
Figure 4F:
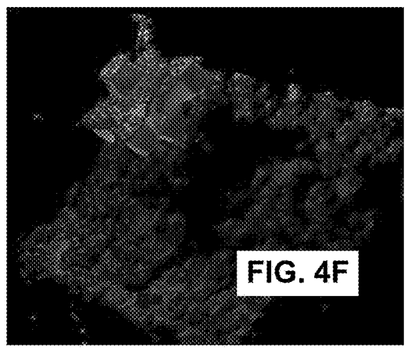
FIG. 4F shows the combined image of FIG. 4E taken from the viewpoint of FIG. 4B.

In order to show the backside of the block as the eyepoint is moved around, we obtain the data on the relative coordinates of the surface of the block, and construct a model of the block in the computer as in FIG. 4C. The coordinates of the model are best taken from the machine drawings of the mold for the block, but any measurement of the surface of the block may be used. The data may be stored as a set of x, y, z coordinates detailing the entire surface of the block, or a subset of the data may be stored if there are symmetries like reflection in a plane or rotation about an axis. In general, more of the surface must be measured than can be viewed from a single viewpoint by the sonar system. Generally, the entire surface of the block is measured. The center of mass of the block is determined by calculation from the measured surface, or by measurement. In order to track and align the model with the data, a set of points such as sketched in FIG. 4D are created based on the vertices and faces of the 3D model. These points are then aligned with the data points using a recognized image matching technique such as 'Iterated Closest Point' (ICP). Many other methods of finding the best fit between sets of points in three dimensions could be used. FIG. 4E shows the data of FIG. 4A overlaid on to an image of the model aligned with the sonar data. FIG. 4F shows data from the viewpoint of FIG. 4B with the model drawn in where the sonar data is missing.

Figure 5A:
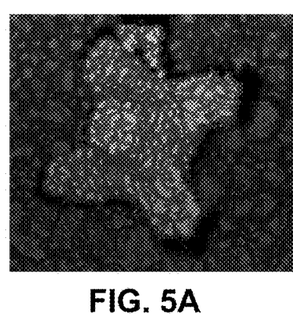
FIGS. 5A-5F show sonar images of a block and images chosen from a model of the block in the steps of finding orientation of the model which will be the same as the orientation of the block.
Figure 5B:
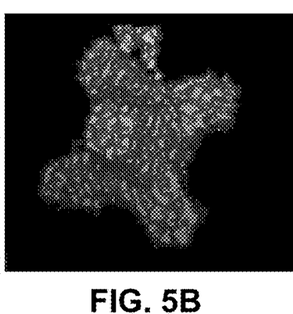
Figure 5C:
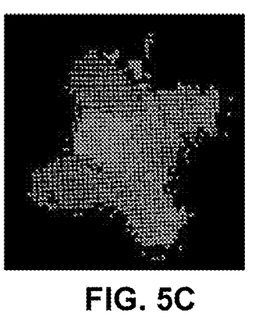

The ICP algorithm and other point matching algorithms require a time proportional to the number n of points in the first set of points to be matched times the number m of points in the second set of points. This time proportional to n x m may be reduced to n log m by reducing the set of points from the model to just those points which could be seen from an Echoscope®. FIG. 5A shows the Echoscope® data with the data from the background. FIG. 5B shows the data of FIG. 5A where the background has been set to zero. FIG. 5C is the sonar data of FIG. 5B reduced to a set of coordinate points.

Figure 5D:
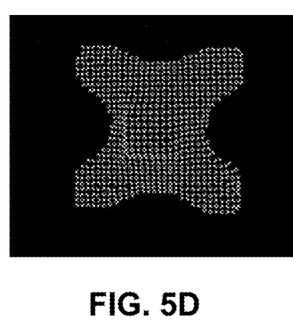
Figure 5E:
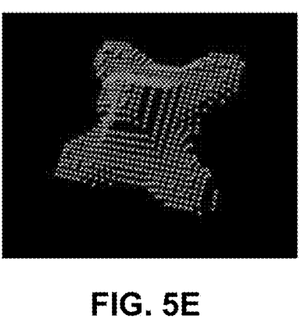
Figure 5F:
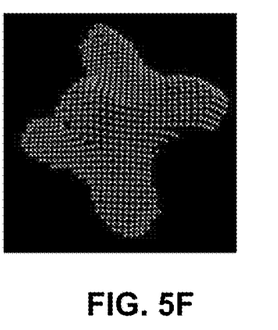
Figure 6A:
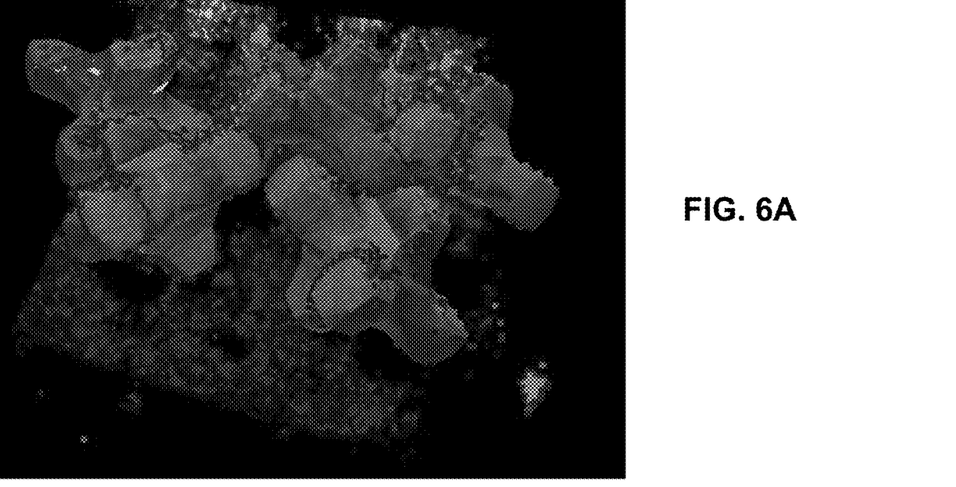
FIG. 6A shows a background image of models of prepositioned blocks.
Figure 6B:
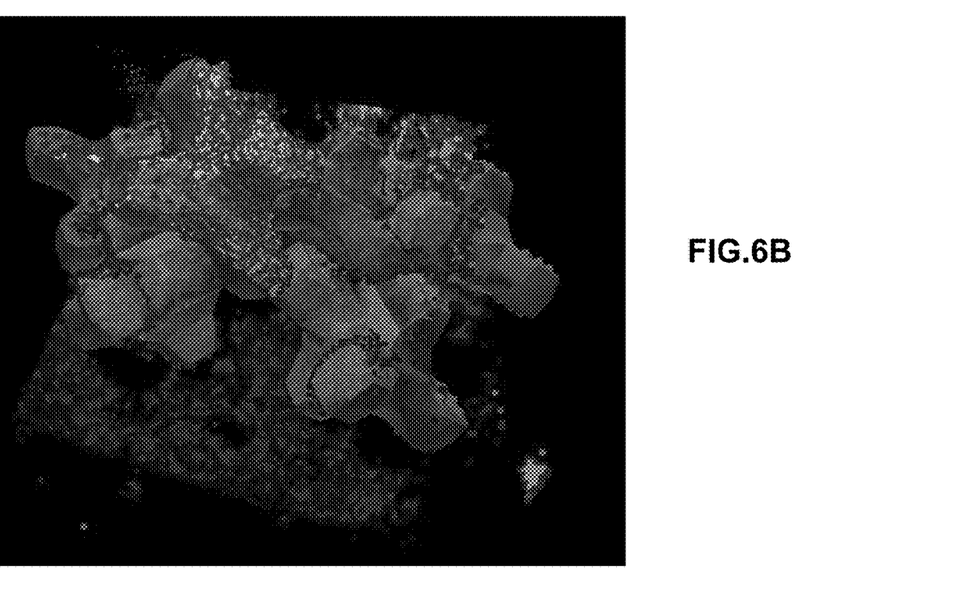
FIG. 6B shows model of a new block positioned among the blocks of FIG. 6A.
Figure 7A:
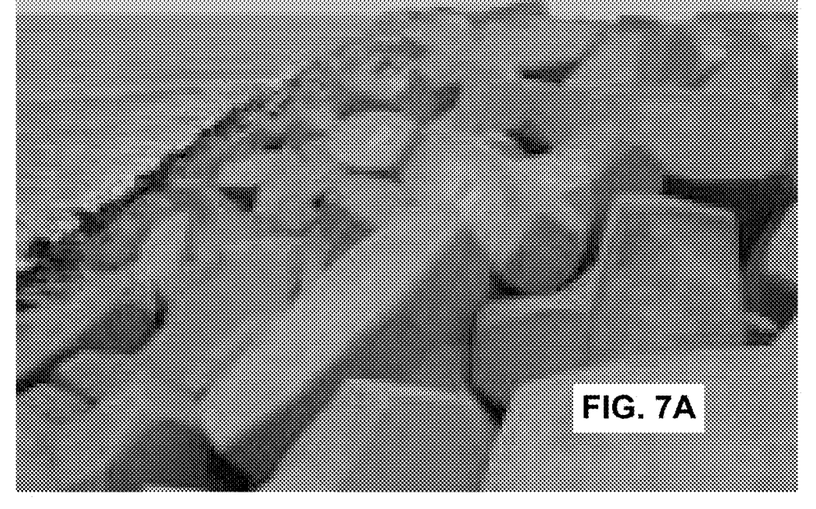
FIG. 7A and 7B show photographs of portions of breakwaters above water level.
Figure 7B:
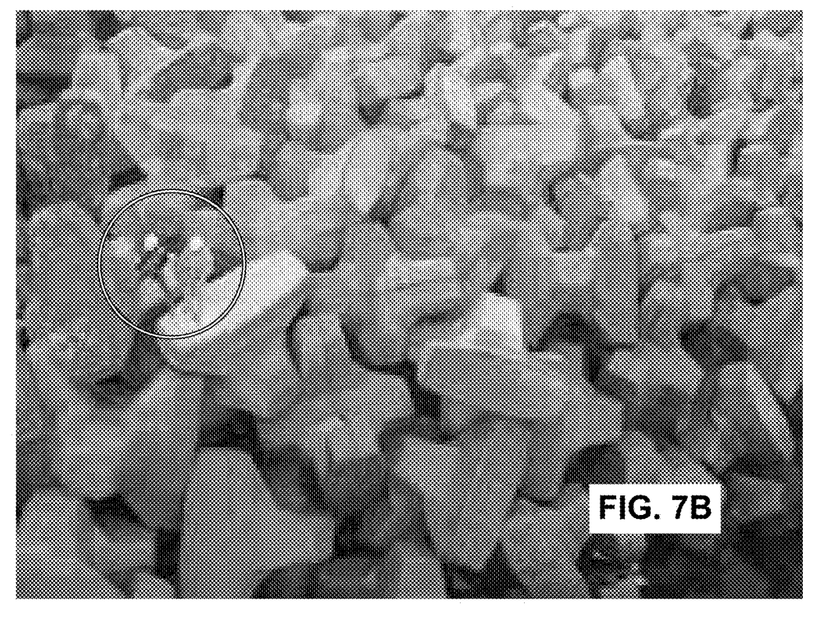

FIG. 5D shows one of a small (<20) set of points representing a part of the surface of the block, which are iteratively matched to the points of FIG. 5C to find the tilt and rotation needed to bring the model into matching position FIG. 5E with the block. FIG. 5E shows the rotated and tilted points used in FIG. 5D. Note that some points in FIG. 5D would not be seen, and can be removed to give a set of points as in FIG. 5F. Once the orientation of the block has been roughly calculated, some points are removed as they are not visible, and other and points that come into view upon the rotation are added, to further match the model orientation with the sonar data from the object as in FIG. 5F. This process is repeated with each of the small set of points, and the best match chosen to give the best orientation of the model to the block Now, the orientated model image is added to the sonar data to provide views of the backside of the object as in FIG. 4F. The total time taken to match the model points to the sonar points is much less when matching each of the small set of points and using the best match than using all the data points from the model.

Before the first block in a set of blocks is laid, a sonar image of the background is recorded. The position and orientation of the sonar source and sonar imaging device are recorded, so that the "background" of the sonar shadow can be filled in when the block is moved into place. The orientation of the block is known after it is placed, and the "image" of the block can be added to the background. As the blocks are placed, the position, orientation, etc. of each block is recorded so that the entire background may be matched. The measurement of the exact positions of the background blocks and the exact position of the equipment supporting the block being placed is at times not accurate enough to ensure correct placement of the blocks, and it is often preferable that the background be measured as the block is being moved into position.

The block is moved into position to place it in a location and orientation with respect to the other blocks. The location and orientation must satisfy a criterion. One such criterion is that each block is supported by contact of at least three contact points with other blocks.

As the block is being moved and rotated, the movement and rotation is slow compared to the rate at which sonar images are recorded. The velocity and rotation of the block is measured by measuring the location of the excavator arm and the distance from the excavator arm to the block, and measuring the rotation of the block from ping to ping. The position and rotation of the block is predicted at the time of the next ping, and the previous set of points for matching model to sonar image is adjusted take into account the new position and rotation angle, so the iterative process of matching takes much less time. Much less time is then used to track the block accurately. For example, a set of points along one edge of the block can disappear, while another set of points on the opposite edge swings into view.

In viewing the block and background in the sonar image, the background can also be enhanced by using previously recorded orientations and positions to "draw in" the previously placed blocks. The sonar data is then much easier to understand, especially when the eyepoint is rotated back and forth to give enhanced 3D visualization. The previously recorded background orientations and positions may be augmented or replaced by images collected in as the blocks move into place.

Figure 8:
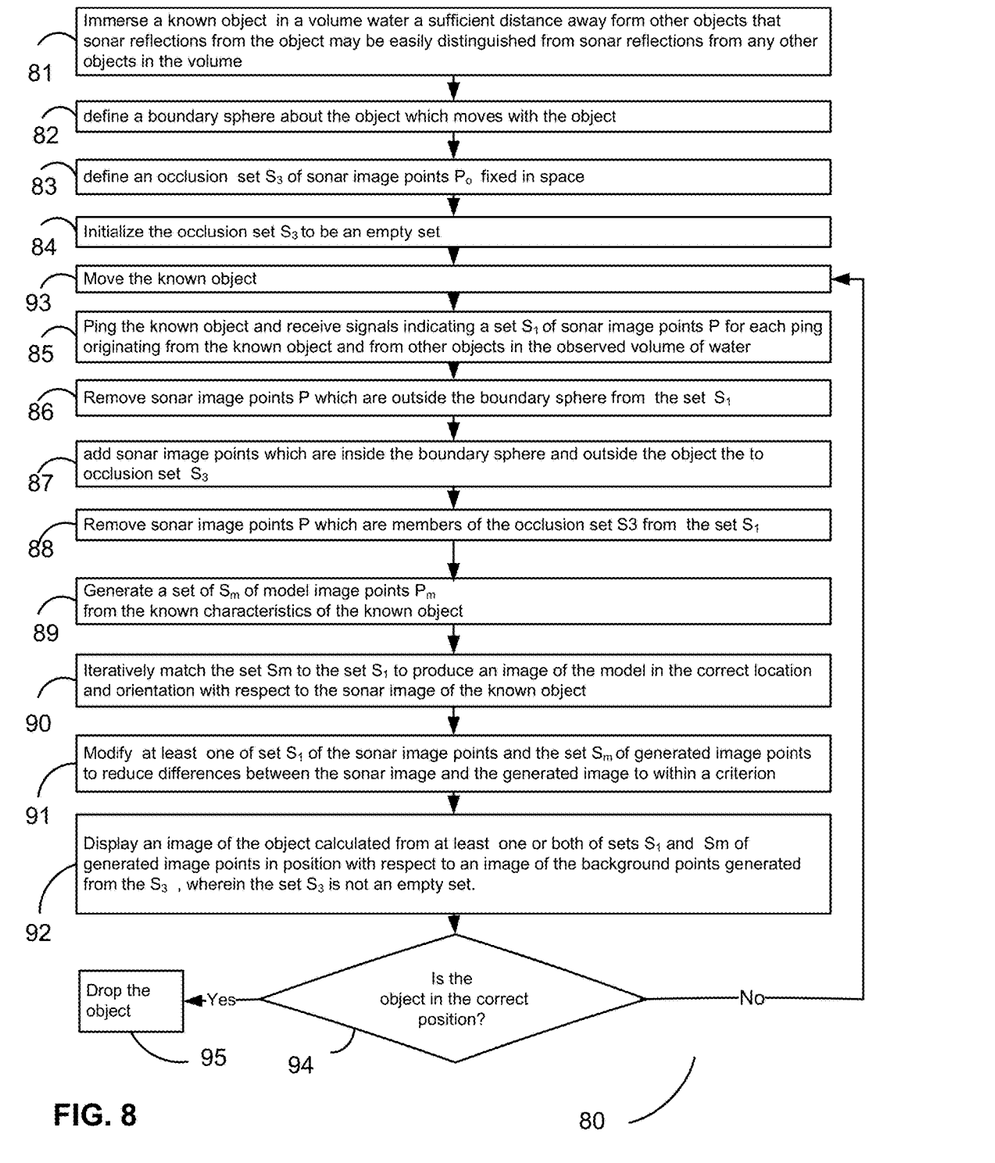
FIG. 8 shows block diagram of the method of the invention.

A novel method of treating sonar data shown in the block diagram of FIG. 8.

In step 81 the object is immersed in an open volume of water sufficient that sonar reflections from the object may be distinguished from sonar reflections from any other objects in the volume. Of course, any fluid or gas which supports sound waves are anticipated by the inventor.

A boundary sphere is defined about the object in step 82. The boundary sphere is any volume of space of whatever shape needed to limit the data which is returned by the sonar system and is not needed, or indeed would interfere with the process of locating the object and measuring its position and orientation. The boundary sphere would generally move with the object and might be changed from ping to ping. A sphere centered in the center of mass of the object is mathematically simplest to calculate and use, but any other shapes are anticipated by the inventor.

In step 83, an exclusion set of sonar image points is defined. The exclusion set will contain all sonar image points received by the sonar system which have been added to the exclusion set because they satisfy a criterion.

In step 84, the exclusion set is initialized to be an empty set.

In step 93, the object is moved.

In step 85 the object is pinged, and sonar signals returned are analyzed to provide a set of sonar image points.

In step 86, the sonar image points outside the boundary sphere are removed from the set of sonar image points.

In step 87, sonar image points which are included in the exclusion set are removed from the set of sonar image points.. (In the first ping of the series, there are no points in the set. The system will return to step 85 over and over for a new ping until a decision is made to end the process. The occlusion set will buiild up with all the image points from the background as the object is translated and rotated and will be used to construct a background in later steps).

In step 88, a sonar image of the object is constructed.

In step 89, an image of the object calculated from the known characteristics of the object is generated.

In step 90, the sonar image and/or the generated image are modified to get the best fit between the sonar and the generated image.

In step 91, image points which are within the boundary sphere and more that a defined distance (which may depend on resolution of the sonar system) from the object are added to the occlusion set. These points are presumably from the background, and may be used to draw an image of the background if required. The sonar and generated image may optionally be recalculated to get a better fit. The data from this ping may then be used to display the object and/or the background on a display screen in step 92. The object is then moved to a new position and returned to step 93 to move the object and to start a new ping. The exclusion set contains image points fixed in space representing any points that have been within the boundary sphere did not arise from the object, and thus are presumably background points, which can be used to maneuver the object into position. If the background is well characterized, the image points from the background may be combined with the image points of the exclusion set.

If the sonar image is constructed with data which is probably coming only from the object, the matching program is much faster and more accurate.

Step 94 represents a decision step to decide whether the object is in the right place to place the object, or whether to continue until the object is in the correct place. In step 95, the system returns to step 93 (with the exclusion set having the sonar image points measured in previous pings) to move the object and repeat the process.

Step 94 places the object and allows the operator to pick a new block and put the new block in place.

A skilled excavator operator using the Echoscope® can place many more blocks at a rate much higher than had previously been possible using optical cameras and or divers. Of course, a computer is even better at 3D visualization that a human excavator operator. The computer can itself plot a course wherein the block is rotated and translated to its optimal place. The computer remembers the surfaces of all the other blocks "in the way" and can maneuver the various projections of the block around the projections of the other blocks to make a better and more secure fit. The author anticipates that the entire process can be carried out by the computer with no more input from an operator than checking the image screens.

Obviously, many modifications and variations of the present invention are possible in light of the above teachings. It is therefore to be understood that, within the scope of the appended claims, the invention may be practiced otherwise than as specifically described.

The invention claimed is:

1. A method of tracking a known object immersed in a sound wave transmitting medium, comprising:
 a) sending sonar signals from a sonar signal generator towards the known object;
 b) receiving sonar signals reflected from the known object and from other objects near the known object, the sonar signals received by a sonar signal receiver; wherein at least one of the other objects is closer than a defined distance to the known object;
 c) calculating from the received sonar signals the three dimensional (3D) positions of a set $S_1$ of sonar imaging points P, wherein the sonar imaging points P are on the surface of the known object and on the surfaces of the other objects near the known object;

d) defining a closed bounding sphere around the known object, the bounding sphere having a radius sufficient to surround all points on the surface of the known object, wherein the distance between the surface of the bounding sphere and all points on the surface of the known object has a defined minimum;

e) removing sonar image points $P_e$ from the set $S_1$, wherein sonar image points $P_e$ are exterior to the bounding sphere;

f) adding sonar image points $P_o$ to a set of occlusion points $S_3$, wherein the sonar image points $P_o$ are interior to the bounding sphere and greater than a defined distance from the surface of the known object;

g) removing the set $S_3$ of occlusion points from the set $S_1$;

h) generating a combined 3D image of the known object calculated from the set $S_1$ of the other objects calculated from the set $S_3$, wherein the relationship between the known object and the other objects may be determined by viewing the combined image from different eyepoints;

and if the object is not in the correct location with respect to the other objects to within a specified criterion;

i) moving the object repeating steps a)- i);

and if the object is in the correct location with respect to the other objects to within a specified criterion;

j) placing the object.

2. The method of claim 1, further comprising;

after step g), $g_i$) fitting a set $S_m$ of model data points $P_m$ to the points P of the set $S_1$ according to a criterion,
  wherein points $P_m$ are points on the surface of a model of the known object, the model of the known object generated from known characteristics of the known object; and $g_{ii}$) changing at least one of the sets $S_m$ and $S_1$.

3. A method of tracking a known object immersed in a sound wave transmitting medium, comprising;

a) sending sonar signals from a sonar signal generator towards the known object;

b) receiving sonar signals reflected from the known object and from at one or more other objects near the known object, wherein the at least one other object near the known object is closer than a defined distance to the known object;

c) calculating from the received sonar signals the three dimensional (3D) positions of a set $S_1$ of sonar imaging points P, wherein the sonar imaging points P are on the surface of the known object and on the surfaces of the other objects near the known object;

d) determining which of the sonar imaging points P in the set $S_1$ are on the surface of the known object;

e) matching the sonar imaging points P on the surface of the known object to known points on the surface of a model of the known object, wherein the model of the known object has the same orientation as the known object;

f) generating a 3D image of the known object, wherein at least part of the 3D image of the known object is a 3D image constructed from known points on the surface of the model of the known object.

4. The method of 3, further comprising;

g) combining a 3D sonar image of the other objects producing sonar imaging points of the set $S_1$ to the 3D image of the known object.

5. The method of 4, wherein;

at least one of the other objects is a known other object, and wherein the 3D image of the at least one known other object is a 3D image constructed at least in part from known points on the surface of the at least one known other object.

6. The method of 3, wherein, at least one of the other objects is between the sonar signal receiver and the known object.

* * * * *